US007690188B2

(12) United States Patent
Schwarz et al.

(10) Patent No.: US 7,690,188 B2
(45) Date of Patent: *Apr. 6, 2010

(54) COMBINATION ENGINES FOR AIRCRAFT (75) Inventors: Frederick M. Schwarz, Glastonbury, CT (US); Brian M. Fentress, Marlborough, CT (US); Andrew P. Berryann, Manchester, CT (US); Charles E. Lents, Amston, CT (US); Jorn A. Glahn, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 482 days.

This patent is subject to a terminal disclaimer.

(21) Appl. No.: 11/713,262

(22) Filed: Mar. 2, 2007

(65) Prior Publication Data

US 2008/0209911 A1 Sep. 4, 2008

(51) Int. Cl.
*F02K 3/00* (2006.01)
*F02K 7/00* (2006.01)
*F02K 9/00* (2006.01)
*F02K 99/00* (2006.01)

(52) U.S. Cl. .............................. 60/224; 60/225; 60/782; 60/785; 60/226.1; 60/262

(58) Field of Classification Search .................. 60/224, 60/225, 782, 785, 226.1, 262
See application file for complete search history.

(56) References Cited

U.S. PATENT DOCUMENTS

| 7,485,981 | B2 * | 2/2009 | Schwarz et al. ............... 290/52 |
| 2008/0277533 | A1 * | 11/2008 | Schwarz et al. ........... 244/53 B |
| 2009/0065652 | A1 * | 3/2009 | Schwarz et al. ........... 244/53 R |

* cited by examiner

*Primary Examiner*—Michael Cuff
*Assistant Examiner*—Craig Kim
(74) *Attorney, Agent, or Firm*—Kinney & Lange, P.A.

(57) ABSTRACT

An engine combination for generating forces with a gas turbine engine generating force, and an internal combustion engine provided in the combination as an intermittent combustion engine generating force having an air intake, there being an air transfer duct connected from a compressor in the gas turbine engine to the air intake to transfer compressed air thereto.

21 Claims, 3 Drawing Sheets

COMBINATION ENGINES FOR AIRCRAFT

BACKGROUND OF THE INVENTION

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines generate such large thrusts for propulsion, or horsepower for engines with an output shaft, by combining large volumes of air with large amounts of fuel, and thereby form a jet of large velocity leading to the capability to provide desired speedy flights.

In addition to providing thrust, such gas turbine engines have operated integrated drive generators to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for much larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly which can severely limit the length of otherwise long duration uses, and also brings those engines closer to becoming operationally unstable.

First, in affecting engine operational stability, a gas turbine engine comes to have a smaller operational stability margin as the aircraft it powers gains altitude. This can be seen in a typical performance map of the high pressure compressor in a gas turbine engine such as the example shown in FIG. 1A in which there are plots presented in the same graph for both compressor stall lines and steady state operating lines, each given for different altitudes, these plots showing the ratio of the compressor outlet side pressure to the inlet side pressure versus a compressor fluid flow parameter. Transitions from one operating line to the next at a greater altitude are made along curves representing rotational speed increases resulting from the engine power being increased to gain that altitude, and these samples of these curves are indicated on the graph by the parameter $N/T^{1/2}$ where N is the actual compressor rotor rotational speed and T is the temperature in ° R (° K.).

The compressor fluid flow capacity at locations of passageways for flowing fluids in the engine is representable by this flow parameter, $WT^{1/2}/(PA)$, with W being the air mass flow rate in lbsm/sec (kg/s), T the temperature in ° R (° K.), P the air pressure in lbs/in² (Pa) and A the cross sectional area of the engine fluid passageways (for a compressor, the air passageways between the various blades and the direction setting vanes therein) in in² (m²). This flow capacity is limited by the fixed cross sectional area geometry of those engine passageways (fixed except for a few variable compressor stages). Thus, the cross sectional area A has been dropped from the flow parameter on the abscissa axis in the graph of FIG. 1A since it is a constant for a particular engine as is represented in the example given there.

An atmospheric reality is that, as the aircraft with this gas turbine engine gains altitude, the air inlet pressures decrease, and so then do all of the pressures in the engine compressors, to thereby decrease P in the denominator of the above given flow parameter of any engine gas flow path passage. Also, the air temperatures decrease with altitude to thereby decrease T in the numerator of that flow parameter. However, the rate of decrease of the pressure is greater than the rate of decrease of the temperature resulting in the flow parameter increasing as the aircraft and turbine engine therein gain altitude to thereby cause the air flow into these passageways to be in effect "overstuffing" them as result of their fixed cross sectional areas.

In fact, as the aircraft altitude exceeds approximately 36,000 feet (~11,000 m), the atmosphere essentially ceases to get colder with increasing altitude than about the −65° F. (−54° C.) reached at that altitude. This is so even though the atmospheric pressure continues to decrease with increasing altitude, and thus the apparent air flow through the compressor above that altitude as expressed in the flow parameter appears to increase even more effectively. That is, the pressure ratio value will move up along a corresponding rotational speed curve to a higher altitude operating line and the value of the flow parameter will then move to the right as the new altitude is achieved and the engine operating conditions will move along the abscissa axis of the graph in FIG. 1A leading to a further pressure ratio value increase along the new operating line. Thus, the engine is left operating on a higher altitude operating line in FIG. 1A at a higher pressure ratio on that line which in turn will leave it with less surge margin, that is, a lesser tolerance both for continued operation in such circumstances as transient excursions in the operating point of the engine and for the normal occurrence of surface erosion of compressor airfoils during engine operation.

Because the air density is decreasing with the increase in altitude (which leads to the Reynolds number characterizing the air that is flowing through the compressor to also be decreasing), the boundary layer turbulence along the compressor blades will also accordingly be decreasing. As this boundary layer turbulence decreases, the vulnerability of each set of compressor blades to have the air flow past them separate therefrom also increases. At some point, these separations will start on small regions of a number of the compressor airfoils and, as the aircraft climbs in altitude, the separated regions will increase in size to such an extent as to decrease the capability of the blades to compress the air at the very time that more of such capability is needed because of the increased flow parameter thereby, and this leads to efficiency losses growing until the compressor suddenly stalls.

Figure 1A:
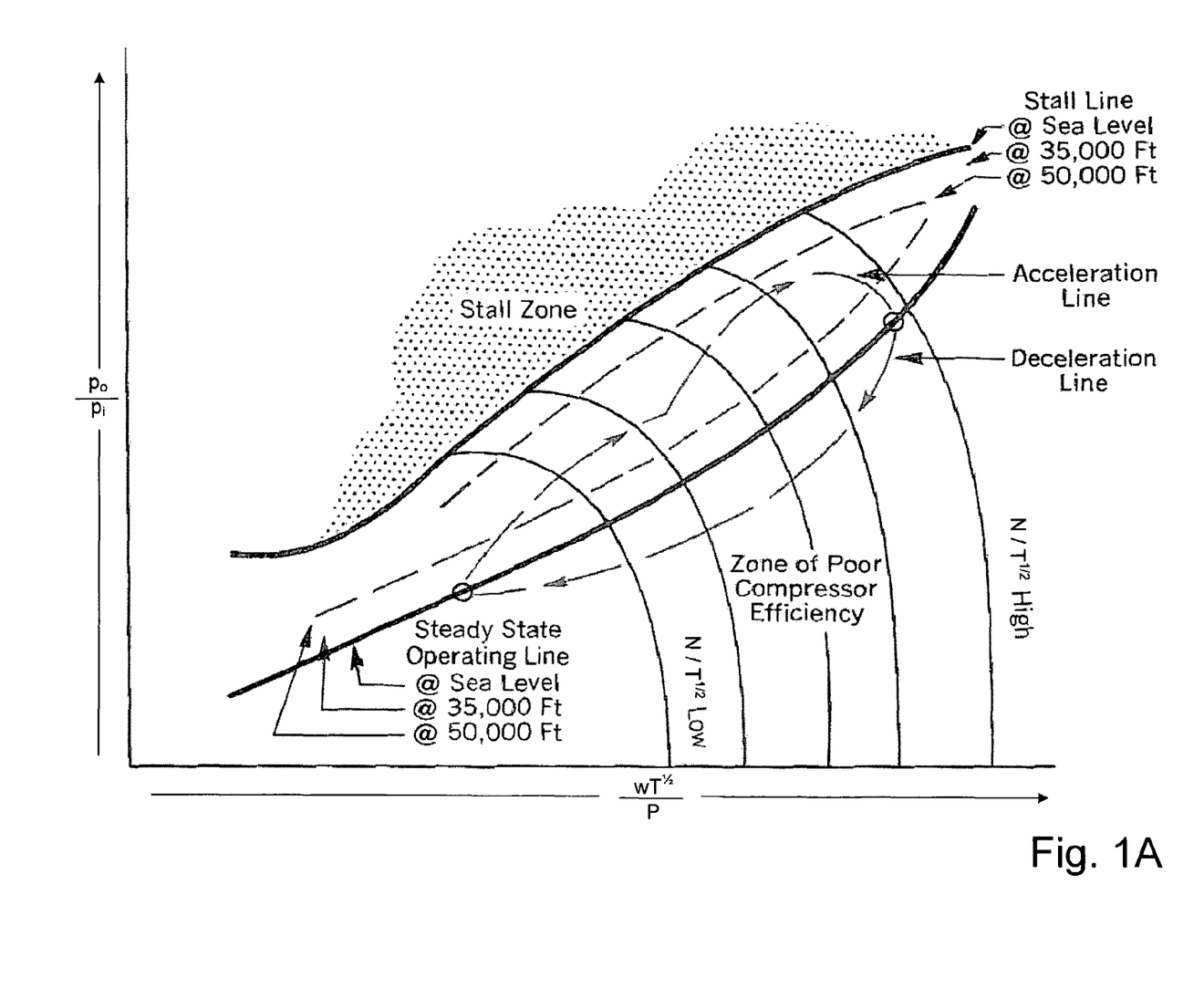
FIGS. 1A and 1B are graphs showing plots of aspects of gas turbine engine behavior.

The stall line in FIG. 1A including such stall points thus decreases along the ordinate axis with increasing altitude (and the corresponding increase in the flow parameter through all of the engine) which is accompanied by corresponding decreases in air density and the Reynolds number characterizing that air flow.

The steady state engine operating line shown in FIG. 1A represents the pressure increase versus flow characteristics of the engine high pressure compressor together with the back pressure faced by that compressor in its forcing air and combustion products fluids through the engine turbine. The first order determiner of the turbine's back pressure, or more precisely, its flow capacity is the first turbine stator vane flow area. The first rotor blade flow area and the turbine efficiency will be factors also, but to a lesser extent.

This turbine flow capacity is again represented by the flow parameter $WT^{1/2}/P$, and so the turbine back pressure will increase as the altitude increases because of the corresponding increase in that flow parameter. This is because the increase in the flow parameter $WT^{1/2}/P$, here too, leads to the fluids flowing through the turbine fluid passageways in effect "overstuffing" them with their fixed internal areas since, as described above, the atmospheric pressure P will drop more rapidly than the atmospheric temperature T as the aircraft and engine climb in altitude. This result of the change in atmospheric conditions is reflected as changes within the engine at every point. That is, conditions within the engine are a function of both the power level and the atmosphere in which it operates.

This is compounded, as indicated above, because, as the aircraft with the turbine engine climbs through the atmosphere, the atmospheric pressure drops at fairly constant rate but the temperature drops until reaching around −65° F. (−54° C.) at about 36,000 feet (~11,000 m) where it then essentially stops declining altogether with increasing altitude. Thus, a turbine engine at a higher altitude is left with relatively high internal temperatures even at low pressure, and the factor $T^{1/2}$ in the flow parameter is not changing at all as the aircraft with the engine further climbs and, again, there is a corresponding decrease in the Reynolds numbers for the fluid flows at the engine turbine. The result is seen in the rising engine operating line along the graph ordinate axis as the compressor must be operated at ever higher compressions to overcome this increasing turbine back pressure.

Thus, the compressor stall line plotted in the graph of FIG. 1A moves down along the ordinate axis of that figure as the aircraft with the engine climbs, as described above, and so moves toward the rising steady state operating line thereby decreasing the stability margin, that is, the separation between the compressor operating point and the stall line. The region above the stall line, or the "stall zone" as it is termed in FIG. 1A, represents flow and pressure combinations that are too great to be maintained in the engine. The high pressure at the exit of the high pressure compressor cannot be maintained and at some point the flow through that compressor reverses. The basic problem is brought on by the inability of individual rows of compressor airfoils to provide the pressure rise demanded for proper operation of the other engine components.

The flow parameter above, and the well known Reynolds number in fluid mechanics are interrelated as indicated above, the Reynolds number being expressible as $$Re = \frac{\rho WL}{\mu} = \frac{WL}{\nu} = \frac{\text{Inertia forces}}{\text{Viscous forces}},$$

where:
W—mean fluid velocity,
L—a characteristic length in the fluid flow situation of interest,
μ—(absolute) dynamic fluid viscosity,
ν—kinematic fluid viscosity: $\nu=\mu/\rho$,
ρ—fluid density.

As a result, the effects of the rate of decline of the atmospheric pressure P and of the atmospheric temperature T on that flow parameter are also reflected in corresponding changes in the Reynolds number of the fluids involved. The nature of the relationship beyond the fluid velocity common to each is first indicated through the mass flow rate definition as $W=\rho VA$ so that V is proportional to W/A, and, secondly, through the ideal gas law approximation as $P=\rho RT$ where R is the universal gas constant so that T/P is inversely proportional to the fluid density ρ.

From the foregoing, in the high pressure compressor, the operating line shift upward along the ordinate axis in the graph of FIG. 1A is primarily explained by events at the turbine, but the downward shift in this compressor map of the stall line is primarily explained by events at the compressor. The Reynolds number on each airfoil drops as the engine climbs and the frictional effects become more dominant. Higher Reynolds numbers indicates more turbulent flow that has high inherent loss but it also will more readily remain attached to the airfoils. On the other hand, as the Reynolds number drops, the flow will separate from those airfoils until the flow capacity of the stages drops to an unsustainable level thereby resulting in the surge into the stall zone.

Secondly in affecting engine operational stability, rapid shifts in the engine operation from the existing steady state operating point, such as suddenly required engine accelerations or sudden peaks occurring in electrical power demand in electrical power generators forcibly rotated by that engine, lead to transient excursions in the operating point of the engine as shown on the compressor operation map of FIG. 1A. The engine operation point transition path of the high pressure compressor from the steady state operating line is above that of the steady state operating line during engine accelerations as indicated in that map to more closely approach a stall condition. Thus, such accelerations lead to engine operation closer to the unstable engine operation region in the graph, and similar operation transition paths are followed in connection with occurrences of electric power demand peaks. The engine fuel control reacts to such shifts by demanding a larger fuel flow rate into the turbine engine combustor to provide the necessary additional engine power to enable it to handle those shifts, shifts which often occur rather abruptly. The higher heat thereby released in the combustor represents a back pressure to the compressor which explains the resulting engine operating point transition movement, or transition path, being above the steady state operating line. Of course, engine deceleration directives or the occurrences of troughs in the electrical power demand brings the opposite result of the operating point following a transition path below the steady state operating line as is shown also in FIG. 1A.

Figure 1B:
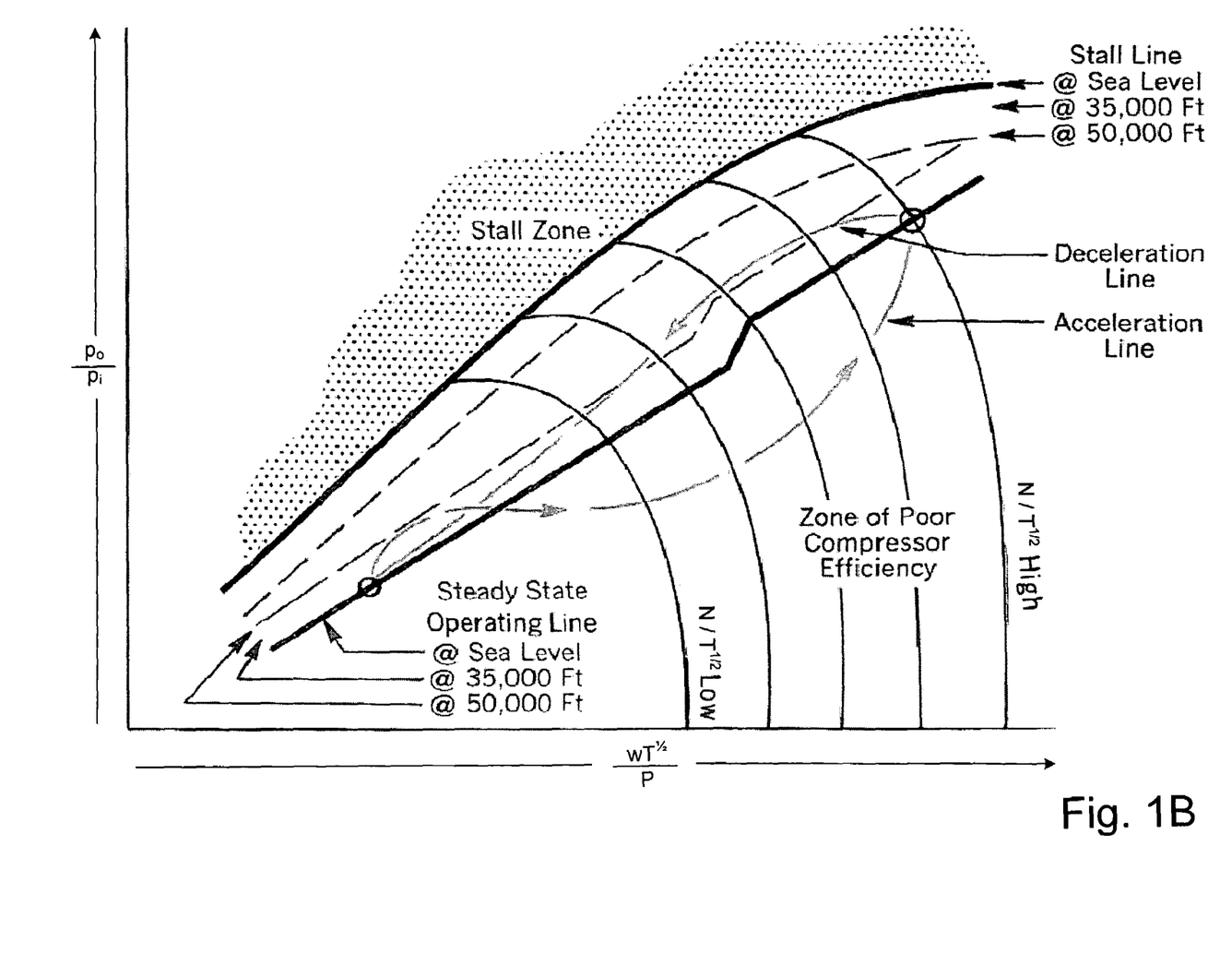

FIG. 1B shows a typical performance map of the low pressure compressor in a two stage gas turbine engine, and again there is shown a compressor steady state operating line plot and a stall line plot having the ratios of the compressor outlet side pressure to the inlet side pressure plotted versus the same fluid flow parameter again at different altitudes. Here, the transition path of the low pressure compressor operating point resulting from an engine acceleration operating transient is below the steady state operating line with the same result holding during an electric power demand peak. The high pressure compressor accelerates faster in this circumstance, as indicated above, thereby momentarily attempting to draw more air from the low pressure compressor and so momentarily reducing the back pressure on the low pressure compressor to yield the transition path shown therefor in FIG. 1B during such accelerations. Again, the opposite is true for decelerations where the inertia of the low pressure compressor momentarily puts it in the position of trying to overflow the high pressure compressor and the transient operating line thus follows a path above the steady state line closer to a stall condition. This will potentially result in a low pressure compressor surge into the stall region.

Of course, such problems could be avoided by providing a gas turbine engine of greater thrust capability than is needed to propel the aircraft to thereby provide adequate capacity for generating needed electrical power. However, if that needed power is not needed on a fairly constant basis to propel the aircraft, such a gas turbine engine will often be operating very far from its optimal operating point as it propels the aircraft, and this leads to significantly degraded fuel use efficiency thereby limiting the duration of flight in an aircraft using such an engine.

Another possibility is the addition of a further small auxiliary gas turbine engine for operating the electrical power generator to provide the needed electrical power. Again, however, for uneven electrical power demands over time, the engine will either be have to be oversized or will be operated inefficiently in meeting the power peak demands and with operating excursions bringing it near to becoming unstable. Even more important, this small auxiliary engine will have poor fuel consumption because the fuel consumption performance of all turbomachinery worsens as it is scaled down since high loss boundary layer flows and tip clearance flows represent a larger fraction of the total fluid flow of the smaller engine.

In the situation of a relatively small aircraft being selected with a small gas turbine engine for propulsion to provide relatively good fuel consumption at altitude and so long flight endurance, the aircraft would need to have a large wing area and high lift devices, and would have to be operated from long runways. However, the endurance problem is still not satisfactorily solved because such engines do not scale down to small sizes so as to maintain the fuel use efficiencies for power generation and, of course, are limited by instability of the compressor in the peaks of electrical power they can supply.

Clearly, gas turbine engine operation at greater altitudes alone reduces engine operating stability margins, and both increases and decreases in transient engine power demands due to changing propulsion or electrical power needs risk engine operation instability occurring or the consumption of significant added amounts of fuel, or both. Thus, there is a desire to find a more efficient manner of generating electrical power in an aircraft, especially ones susceptible to large, fluctuating electrical power demands, and with less engine operation instability risk.

BRIEF SUMMARY OF THE INVENTION

The present invention provides an engine combination for generating forces with a gas turbine engine having an air inlet open to the atmosphere, an air compressor, a combustor, a turbine and an exhaust exit nozzle open to the atmosphere positioned along a fluids flow path passing through all for generating force with the air compressor having an air transfer duct extending therefrom so as to receive compressed air therein. In addition, an internal combustion engine is provided in the combination as an intermittent combustion engine having an air intake coupled to combustion chambers therein and a rotatable output shaft for generating force also coupled to those combustion chambers, the air transfer duct being connected to the air intake to transfer compressed air thereto. A control valve can be provided at least partially in the air transfer duct which can be selectively directed to open more or close more to thereby selectively affect the passage of compressed air through the air duct. A primary electrical generator having an output conductor can have a rotatable input shaft connected to the intermittent combustion engine output shaft with the output conductor being electrically energized in response to rotation of the input shaft.

DETAILED DESCRIPTION

From the foregoing, gas turbine engines used to propel aircraft can be seen to not be well suited as energy sources for also operating electrical power generators that are required to deliver large quantities of electrical power, especially in situations in which the quantities demanded of that power change substantially over time or in which those quantities must be delivered over long time durations, or both. Thus, a different kind engine is needed to serve as the energy source for such electrical power generators that is both substantially more fuel efficient and operates stably over a wide range of output powers.

Intermittent combustion internal combustion engines, such as gasoline engines operating on the any of the Diesel, Miller, Otto or Wankel cycles, can operate with a fuel efficiency on the order of seventy percent (70%) better than that of a continuous combustion (Brayton cycle) internal combustion gas turbine engine. Furthermore, this better fuel efficiency of these engines is essentially maintained over a wide range of engine output powers in contrast to the significant fuel efficiency decreases that occur in gas turbine engines if operated away from their optimum operating points. Although such intermittent combustion engines are heavy relative to the output power they provide, they can be relatively small if used primarily for energizing electrical power generators in an aircraft rather than for propulsion of that aircraft.

At high altitudes, internal combustion engines of all kinds face the possibility of limited power output because of the relatively small air pressures there limiting the number of chemical reactions of oxygen with hydrogen and oxygen with carbon in the burning the engine fuel in the engine combustion chamber or chambers. This is solved for gas turbine engines by providing therein very large air flows through use, typically, of axial flow compressors usually in two modules each with multiple stages with both a low compression compressor module followed along the fluid flow path through the engine by a high compression compressor module. These must provide at least enough compressed air to the subsequent combustor to sustain the desired combustion process therein and a mass of flowing air sufficient to combine with enough fuel to provide the energy needed to overcome the aircraft drag at the speed and altitude intended for operation.

However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. Thus, this intermittent combustion engine can be operated at the same relatively high altitudes at which the gas turbine engine propelling the aircraft operates while this turbine engine is also supplying compressed air to that intermittent combustion engine. There, depending on the values selected for the peak air intake pressure and engine compression ratio, the intermittent combustion engine can be used as a power source for an electrical power generator that can generate much greater amounts of electrical power than can one powered by a gas turbine engine when gas turbine engine stability and efficiency are considered.

Such an arrangement, drawing only a relatively small amount of compressed air from the gas turbine engine compressors in relation to the engine compressors' overall flow capacity, and typically from the high pressure compressor, causes only a correspondingly small thrust loss from that engine. Thus, the gas turbine engine can be sized more or less optimally for propelling the aircraft, typically for best fuel use efficiency, rather than being oversized to accommodate the largest peak demands for electrical power. Furthermore, the operating stability of the gas turbine engine is increased to have a greater margin as a result of the intermittent combustion engine drawing compressed air from the high pressure compressor compressed air output as such a draw reduces the back pressure faced by that compressor at its output. Furthermore, the intermittent combustion engine does not have the kind of operational instability problems that the gas turbine engine does and, in fact, serves as an effective buffer in shielding the gas turbine engine from rapid changes in the demand for electrical power that could lead to instability in the gas turbine engine.

The intermittent combustion engine, on the other hand, can be sized to the need for generating electrical power, including accommodating substantial power peaks, which is efficiently met through its being coupled at its output shaft to an electrical power generator sized to provide the required electrical power as the primary power generator. This much more efficient power generation comes from the relatively good fuel use efficiency of the intermittent combustion engine which it achieves by almost completely eliminating such factors as leakage around its moving parts. This is also the reason why these engines maintain their efficiency over a wide range of engine sizes because of the use therein of small leakage seal arrangements between the moving parts and the stationary walls forming the engine combustion chambers such as piston rings or the seals of the Wankel cycle engine.

Moreover, designing an aircraft to be propelled by a gas turbine engine that must also generate large amounts of electrical power is eased when the gas turbine engine is supplemented for electrical power generation by an intermittent combustion engine. Once the intermittent combustion engine is suitably sized for generating electrical power, there is substantial freedom in choosing the location of the intermittent combustion engine while retaining its operational capabilities in drawing compressed air from the gas turbine engine so that the weight of an intermittent combustion engine of that size can be positioned in the aircraft so as to aid in suitably setting the location of the aircraft center of mass. Such freedom can help in preventing unwanted air frame compromises such as adding otherwise unneeded ballast or increased wing area in the layout arrangement thereof in that aircraft. This freedom is especially valuable in an unmanned stealth aircraft that typically has its turbofan engine positioned well to the rear thereof because of the use therein of relatively long inlet portions in the engine housing duct resulting from the desire to hide the front of the engine from impinging electromagnetic radiation.

As the aircraft carrying this engine combination will operate at different altitudes, a satisfactory compressed air draw from the high pressure compressor of the gas turbine engine for the intermittent combustion engine at a high altitude can lead to too much compressed air being supplied to the latter engine at lower altitudes where the atmospheric pressure is greater. Thus, a controlled compressed air flow control valve can be provided in the air transport duct to allow control of the air flow through that duct. As a result, this valve may be fully opened at high altitudes to provide an adequate amount of air for the intermittent combustion engine there but partially closed at lower altitudes to reduce the air pressure at the intermittent combustion engine air intake. The operational capability of the intermittent combustion engine, as a result, will be maintained over all altitudes.

The intermittent combustion engine, in addition, can provide some added electrical power because it is essentially a fixed combustion chambers volume machine and in these the intake pressure is approximately equaled by the exhaust pressure. Hence, the exhaust pressure of this intermittent combustion engine is about that of the compressed air drawn at the air intake thereof from the high pressure compressor which is, of course, quite substantial. Thus, this exhaust has substantial remaining energy which can be used to obtain additional electrical power through being directed through an exhaust turbine provided therefor to rotate an input shaft of a further secondary electrical power. The resulting additional electrical power can be combined through power conditioning circuitry with that power provided by the primary electrical generator having its input shaft connected to the output shaft of the intermittent combustion engine. Alternatively, the additional electrical power can be provided to some aircraft subsystem or subsystems that do not require electrical power with waveforms synchronized to those provided by the main electrical generator.

Although aircraft propulsive gas turbine engines are in all circumstances not well suited as energy sources for operating electrical power generators efficiently as indicated above, they nonetheless retain a capability for doing so. This capability can be used to provide some aid in generating enough electrical power to meet peak demands therefor occurring in the flight of the aircraft with this combination of engines. Another use is in the situation in which the aircraft needs a large supply of electrical power only when flying in a relatively narrow range of altitudes so that the intermittent combustion engine is optimized for the compressed airflow thereto from the turbine engine at those altitudes only, and thus only the turbine engine is used in supplying the relatively small amounts of electrical power used at other altitudes.

One way for using the gas turbine engine in supplying electrical power can be based on one kind of arrangement for the initial starting of the turbine engine involving an electrically operated starter. First, the gas turbine engine must be started typically by rotating compressor rotors using an such an electric starting motor (alternatively, in other arrangements, a pneumatic starting motor can be used, or the intermittent combustion engine can provide such rotor rotation, if first started, through being mechanically coupled to the gas turbine engine for use in such starting of that engine). Such an electric motor, once the engine starting process is complete, can then be operated as a supplemental electrical power generator perhaps through a clutch arrangement to allow the rotor to be disengaged from that starter-generator when added electrical power is not needed.

Another additional supplemental electrical power generator can be operated through a clutch arrangement by the low pressure turbine in the gas turbine engine. In some situations, such clutches can be eliminated and such generators, though being rotated by the gas turbine engine, are prevented from generating electrical power through switching off the electrical energization arrangement therefor thus leaving the generator rotors "free wheeling" during turbine engine use when added electrical power is not wanted. Alternatively, one of these potentially added electrical power generators could be kept relatively small and operated continuously as a backup to power certain of the aircraft control systems, including the control system for the gas turbine engine, in the event of a failure of the intermittent combustion engine or the primary electrical generator mechanically coupled thereto.

Figure 2:
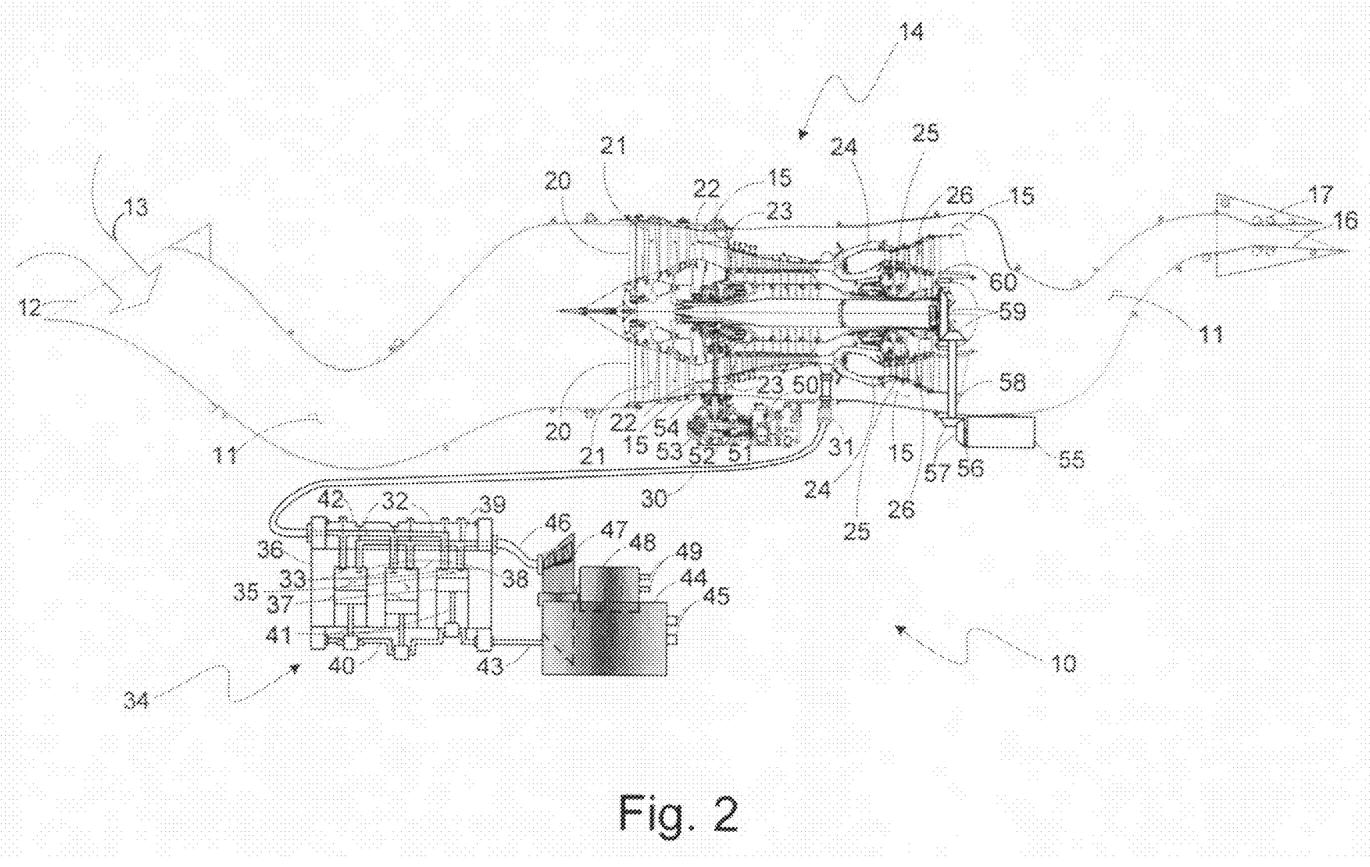
FIG. 2 is a schematic representation of a cross section side view of a portion of an aircraft embodying the present invention.

FIG. 2 shows a side view in partial cross section of a schematic representation of an example of such a gas turbine engine and intermittent combustion engine combination, 10, in an arrangement in which most of the aircraft structure in which they are positioned has been omitted from this view. However, there is at least a portion of an engine duct, 11, in that aircraft that is shown and has an air inlet, 12, facing forward in the aircraft. The configuration shown for duct 11, with its somewhat sinuous shape, is from a stealth type military aircraft several kinds of which are unmanned aircraft. This duct first curves downward, coming from the front of the aircraft at the duct opening provided by air inlet 12 to the atmosphere from which an airstream, 13, is drawn. Then duct then curves upward to open to a gas turbine engine provided as a turbofan engine, 14, in engine duct 11 which uses airstream 13 for combustion and for fan forced air propulsion purposes. This passageway curvature of duct 11 past air inlet 12 serves to hide the front of engine 14 from impinging electromagnetic radiation at various wavelengths. Outer portions, 15, of duct 11 adjacent engine 14 past a splitter convey the fan forced air provided by engine 14 for propulsion purposes into the remainder of duct 11 past engine 14 toward the outlet of duct 11 to the atmosphere.

This fan forced air and the combustion products resulting from combustion in engine 14 are forced out of the remainder of engine duct 11 to an exit nozzle, 16, serving as that outlet of duct 11. A fluid actuation system, 17, provides the force to partial open and close nozzle 16 during the operation of turbofan engine 14. Again, duct 11 past engine 14 first curves downward, coming from that engine, and then the duct curves upward to open to nozzle 16. Here, too, this passageway curvature of duct 11 past engine 14 serves to hide the rear of engine 14 from electromagnetic radiation at various wavelengths impinging at the rear of the aircraft.

Engine 14 has an air inlet guide vane, 20, followed by a high pressure fan, 21, as the fan for the turbofan engine to force air outside and past a splitter, 22, and then through duct portions 15 into the rear of duct 11 and out of that duct through nozzle 16 to exit to the atmosphere. In addition, high pressure fan 21 also serves as a low pressure air compressor through delivering compressed air inside splitter 22 to a high pressure air compressor, 23. The compressed air from high pressure compressor 23 arrives at a combustor, 24, to which fuel is also delivered and burned. The combustion products form a jet of fluid which impinges first on a high pressure turbine, 25, and then on a low pressure turbine, 26, to cause them to rotate which, through appropriate mechanical linkings, leads to high pressure compressor 23 and high pressure fan 21 being forced thereby to also rotate. The combustion products then reach the remainder of duct 11 past engine 14 to exit through nozzle 16 to the atmosphere.

A compressed air conveyance duct, 30, is connected at one end into turbofan engine 14 to receive compressed air from high pressure compressor 23 through a compressed air flow control valve, 31, typically controlled by a system computer (not shown but typically an engine control computer or an aircraft systems computer either eliminating the need for such an engine control computer or operating with it in a distributed control system), and used to control the flow of compressed air from high pressure compressor 23 through duct 30. The opposite end of duct 30 is connected to an air intake, or intake manifold, 32, leading to engine air intake valves, 33, for an intermittent combustion engine, 34, represented in the example of FIG. 2 as a Diesel or Otto cycle engine. Intermittent combustion engine 34 is shown positioned forward in the aircraft of turbofan engine 14 to shift the center of mass of the aircraft forward to counter some of the weight of engine 14 but other positions are possible to be used if desired.

Valves 33 in engine 34 control the air taken into combustion chambers, 35, bounded by an engine block, 36, providing the basic structure of engine 34 and by pistons, 37. Each chamber also has an exhaust valve, 38, through which combustion products are exhausted to an exhaust manifold, 39. A rotatable crankshaft, 40, has a connecting rod, 41, rotatably coupling it to a corresponding one of each of pistons 37. A rotatable camshaft, 42, is used to open and close air intake valves 33 and exhaust valves 38 in a suitable sequence.

Crankshaft 40, under the control of a system controller not shown, is rotated by the force on pistons 37 transmitted thereto by corresponding ones of connecting rods 41 due to repeated combustion events in the corresponding combustion chamber 35 which events occur in all of chambers 35 in a suitable sequence before repeating. These events correspondingly use the air quantities taken through valves 33 repeatedly into, and the fuel quantities repeatedly injected into, those chambers for combustion. The fuel quantities are injected by a fuel injection system not seeable in this figure and the magnitudes thereof are used to select the mechanical power output of crankshaft 40 of the intermittent combustion engine. The resulting combustion products are correspondingly repeatedly rejected from those chambers through valves 38.

If an Otto cycle engine is used as intermittent combustion engine 34, the combustion events are initiated by the repeated sparkings of spark plugs not shown in this figure in a suitable sequence across combustion chambers 35 under the control of the system controller. In addition, intermittent combustion engine 34 has a cooling system not shown for cooling the engine structure about combustion chambers 35. Although the foregoing description is of an intermittent combustion engine employing pistons, other intermittent combustion engine types could alternatively be used such as one operating on the Wankel cycle.

The rotation of crankshaft 40 is suitably fastened to an input shaft, 43, of a primary electrical power generator, 44. The resulting rotation of input shaft 43 electrically energizes output electrical conductors, 45, of generator 44 to thereby generate the desired electrical power thereat for operating aircraft devices (not or not all shown). The demand for electrical power in the aircraft is used as a basis to select the fuel quantities injected in the combustion chambers of the intermittent combustion engine to have that engine supply sufficient mechanical power crankshaft 40 to sufficiently rotate input shaft 43 of generator 44 to meet that demand.

An exhaust duct, 46, extends from exhaust manifold 39 of intermittent combustion engine 34 to an exhaust turbine, 47, to result in the combustion products of engine 34 impinging on the blades of that turbine to thereby cause it to rotate. A central shaft of this exhaust turbine is coupled to an input shaft of a secondary electrical power generator, 48. The resulting rotation of this input shaft electrically energizes output electrical terminals, 49, of generator 48 to thereby generate the further desired electrical power thereat.

Another supplemental electrical power generator is provided in this example by operating an electrical starter (generator), 50, with the electrical motor therein, also being operated as an electrical generator after the completion of the starting process. Starter (generator) 50 rotates high pressure air compressor 23 to start turbofan engine 14 and, thereafter, with engine 14 operating, this compressor can selectively rotate the rotor in starter (generator) 50 to cause the starter motor to be operated as an electrical power generator.

Starter (generator) 50 has drive (input) shaft, 51, extending from the rotor therein to a set of bevel gears, 52, with the bevel gear on the opposite side of this set rotatably coupled to a clutch, 53. Clutch 53 allows the system computer to engage and disengage starter (generator) 50 as appropriate. The opposite side of clutch 53 has a engagement shaft, 54, extending therefrom ending in bevel gear rotatably engaged with a counterpart bevel gear in a portion of high pressure air compressor 23.

A further supplemental electrical power generator, 55, is shown in FIG. 2 for this example which has an input shaft, 56, extending from the rotor therein to a set of bevel gears, 57, with the bevel gear on the opposite side of this set rotatably coupled to a shaft, 58, which in turn is coupled to a further set of bevel gears, 59. These bevel gears are coupled to an output shaft of low pressure turbine 26 through a clutch, 60. Clutch 60, here too, allows the system computer to engage and disengage generator 55 as appropriate.

Although the present invention has been described with reference to preferred embodiments, workers skilled in the art will recognize that changes may be made in form and detail without departing from the spirit and scope of the invention.

The invention claimed is:

1. An engine combination for generating forces, the engine combination comprising:
    a gas turbine engine having an air inlet open to the atmosphere, an air compressor, a combustor, a turbine and an exhaust exit nozzle open to the atmosphere all positioned along a fluids flow path passing therethrough for generating force, the air compressor having an air transfer duct extending therefrom so as to be capable to provide compressed air in that air transfer duct at one end thereof; and
    an internal combustion engine provided as an intermittent combustion engine having an air intake coupled to combustion chambers therein and a rotatable output shaft also coupled to those combustion chambers for generating force, the air transfer duct being connected to the air intake at an opposite end to be capable of transferring compressed air thereto.

2. The combination of claim 1 further comprising a control valve at least partially in the air transfer duct which can be selectively directed to open more or close more to thereby selectively affect the passage of compressed air through the air duct.

3. The combination of claim 1 further comprising a primary electrical generator having a rotatable input shaft mechanically coupled through a coupler to the intermittent combustion engine output shaft and having an output conductor, the output conductor being electrically energized in response to rotation of the input shaft.

4. The combination of claim 1 wherein the intermittent combustion engine has an exhaust outlet coupled to the combustion chambers therein and further comprises an intermittent combustion engine exhaust turbine positioned at the exhaust outlet and a secondary electrical generator having a rotatable input shaft mechanically coupled through a coupler to an intermittent combustion engine exhaust turbine outputshaft, the secondary electrical generator having an output conductor which is electrically energized in response to rotation of the input shaft thereof.

5. The combination of claim 1 further comprising a supplemental electrical generator having a rotatable input shaft coupled through a coupler to the turbine of the gas turbine engine, the supplemental electrical generator having an output conductor which is electrically energized in response to rotation of the input shaft thereof.

6. The combination of claim 5 further comprising a clutch as part of the coupler which can be selectively directed to engage or disengage to thereby selectively complete the coupling to cause the supplemental electrical generator input shaft to be rotated.

7. The combination of claim 1 further comprising an electrical starter having a rotatable operation shaft coupled through a coupler to the air compressor of the gas turbine engine such that the starter can be selectively directed to rotate a rotor in the air compressor or to have a rotor in the starter to be rotated by the air compressor to generate electrical power.

8. The combination of claim 7 further comprising a clutch as part of the coupler which can be selectively directed to engage or disengage to thereby selectively complete the coupling to allow the starter to be selectively directed to rotate a rotor in the air compressor or to allow a rotor in the starter to be rotated by the air compressor.

9. The combination of claim 1 wherein the intermittent combustion engine is positioned at least in part forward of the gas turbine engine in an aircraft propelled by the gas turbine engine.

10. The combination of claim 1 wherein the engine combination is in an aircraft propelled by the gas turbine engine that is a turbofan engine.

11. A method of generating force and electrical power using an engine combination of a gas turbine engine having an air inlet open to the atmosphere, an air compressor, a combustor, a turbine and an exhaust exit nozzle open to the atmosphere all positioned along a fluids flow path passing therethrough and of an internal combustion engine provided as an intermittent combustion engine having an air intake coupled to combustion chambers therein, a fuel system coupled to those combustion chambers and a rotatable output shaft also coupled to those combustion chambers, there being an air transfer duct extending from the air compressor to the air intake to transfer compressed air to the air intake from the air compressor, the method comprising:

operating the gas turbine engine to establish a combustion products flow out the exhaust exit nozzle; and distributing air compressed in the air compressor of the gas turbine engine to the air intake of the intermittent combustion engine.

12. The method of claim 11 further comprising a control valve between the air compressor and the air intake which can be selectively directed to open more or close more to thereby selectively affect the passage of compressed air through the air duct with the engine combination being in an aircraft, and altering the amount of compressed air passing to the air intake based at least in part on the altitude of the aircraft.

13. The method of claim 11 further comprising an electrical power generator having an input shaft coupled to the output shaft of the intermittent combustion engine with the electrical power generator having output conductors which are electrically energized by rotating the input shaft, and selecting quantities of fuel to be injected into the combustion chambers of the intermittent combustion engine based at least in part on the demand for electrical power at the output conductors of the electrical power generator.

14. The method of claim 11 further comprising the intermittent combustion engine having an exhaust manifold coupled to combustion chambers therein, a turbine with an output shaft positioned at an output of the exhaust manifold, and an electrical power generator having an input shaft coupled to the output shaft of the turbine with the electrical power generator having output conductors which are electrically energized by rotating the input shaft thereof, and directing combustion products provided by the intermittent combustion engine in the exhaust manifold during its operation through the output of the exhaust manifold to impinge on the turbine.

15. The method of claim 11 further comprising an electrical power generator having an input shaft and output conductors which are electrically energized by rotating the input shaft thereof with the input shaft coupled through a clutch to a selected one of the air compressor and the turbine in the gas turbine engine, and selectively engaging and disengaging the clutch to cause the input shaft to rotate or not.

16. A power generation system for propelling, and generating electrical power in, an aircraft, the system comprising:

a turbofan engine in an engine compartment in the aircraft with an air inlet in the aircraft open to the atmosphere and leading to an air compressor in the turbofan engine followed by a combustor, the air compressor having an air transfer duct extending therefrom so as to be capable of providing compressed air therein and to the combustor;

an internal combustion engine provided as an intermittent combustion engine in the aircraft having an air intake coupled to combustion chambers therein, a rotatable output shaft also coupled to those combustion chambers for generating force, and a fuel system for providing fuel to those combustion chambers, the air transfer duct being connected to the air intake to transfer compressed air thereto, and a primary electrical generator in the aircraft having a rotatable input shaft mechanically coupled through a coupler to the intermittent combustion engine output shaft and having an output conductor with the output conductor being electrically energized in response to rotation of the input shaft.

17. The combination of claim 16 further comprising a control valve at least partially in the air transfer duct which can be selectively directed to open more or close more to thereby selectively affect the passage of compressed air through the air duct.

18. The combination of claim 16 wherein the aircraft is an unmanned stealth type aircraft.

19. The combination of claim 18 wherein the intermittent combustion engine is positioned at least in part forward of the turbofan engine in an aircraft propelled by the turbofan engine.

20. The combination of claim 16 wherein the intermittent combustion engine has an exhaust outlet coupled to the combustion chambers therein and further comprises an intermittent combustion engine exhaust turbine positioned at the exhaust outlet and a secondary electrical generator having a rotatable input shaft mechanically coupled through a coupler to an intermittent combustion engine exhaust turbine output shaft, the secondary electrical generator having an output conductor which is electrically energized in response to rotation of the input shaft thereof.

21. The combination of claim 16 further comprising the aircraft having selectively operated electrical power consumption devices therein electrically connected or connectable to the output conductor of the primary electrical generator to receive electrical power therefrom.

* * * * *